UNITED STATES PATENT OFFICE.

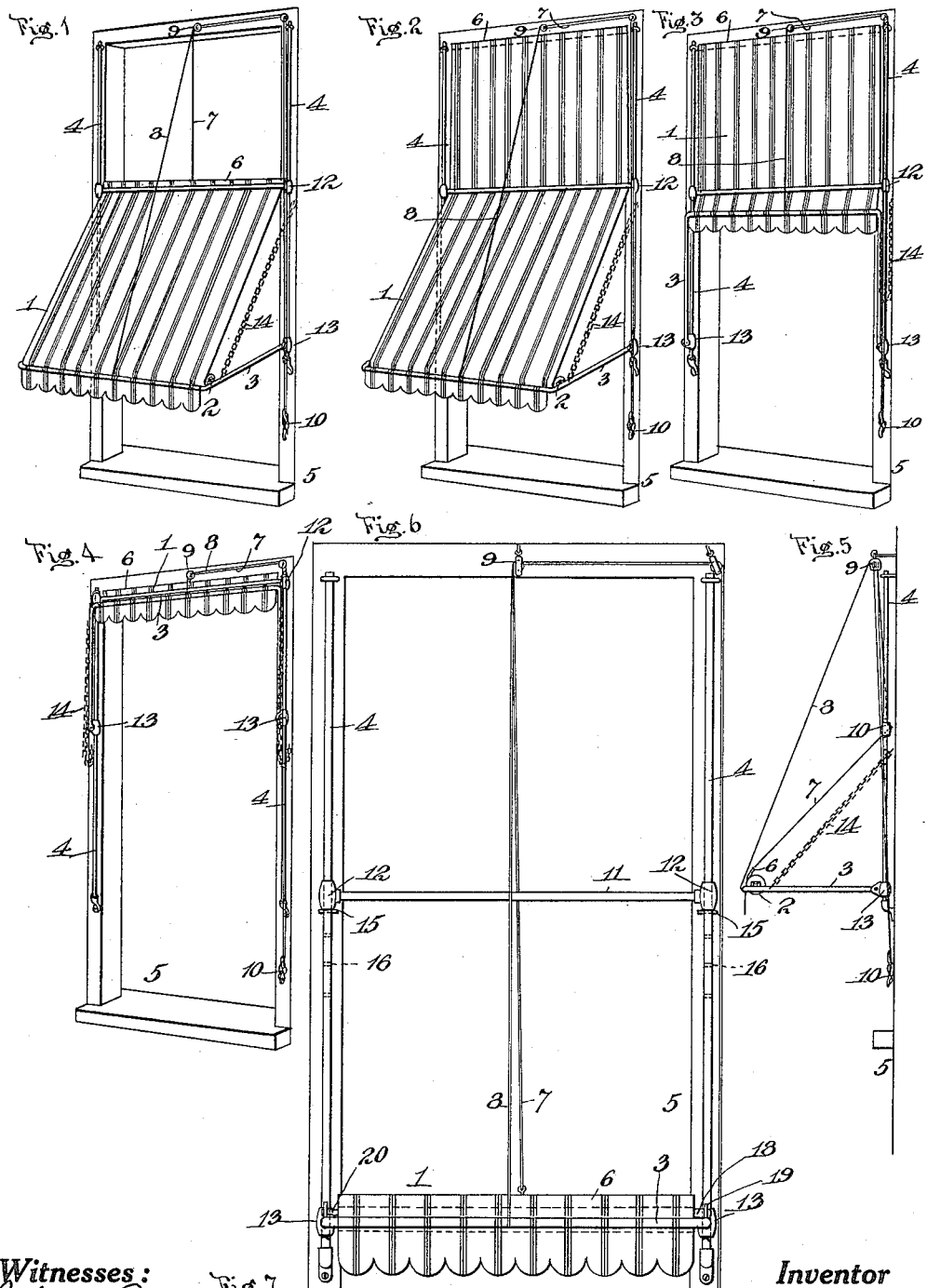

EDMUND F. HARTSHORN, OF NEWARK, NEW JERSEY, ASSIGNOR TO STEWART HARTSHORN COMPANY, OF EAST NEWARK, NEW JERSEY, A CORPORATION OF NEW JERSEY.

AWNING.

1,080,910.  Specification of Letters Patent.  Patented Dec. 9, 1913.

Application filed July 1, 1912.  Serial No. 706,877.

*To all whom it may concern:*

Be it known that I, EDMUND F. HARTSHORN, a citizen of the United States, residing in Newark, county of Essex, and State of New Jersey, have invented a certain new and useful Awning, of which the following is a specification.

This invention relates to improvements in awnings for inclosing windows, doorways, or other openings, such as shop fronts, verandas and piazzas. It is an improvement upon the invention disclosed by my co-pending application for patent filed July 1, 1912, Serial No. 706,876.

This invention has for its object all those disclosed in that case. It also has an additional object beyond that disclosed in my co-pending application.

According to the present invention, the awning can be spread with a portion of the window open,—either the upper or lower portion, at the same time the awning is so formed that when it is furled, it is raised entirely above the window opening.

These and further objects will more fully appear from the following specification and accompanying drawings, considered together or separately.

In the drawings, Figure 1 is a perspective view of a window frame showing an embodiment of my invention in the form of an awning, the lower portion only of the awning being spread. Fig. 2 is a similar view, but showing the awning completely spread. Fig. 3 is a similar view, but showing the lower portion of the awning furled and the upper portion spread. Fig. 4 is a similar view, showing the awning furled and stored. Fig. 5 is a side view of the awning in furled position. Fig. 6 is a front view, on an enlarged scale, of the awning in furled position, and Fig. 7 is a sectional view of the spring roller portion of the awning.

In all of the views, like parts are designated by the same reference characters.

The awning has the shade 1. This shade is connected at one end to a spring roller 2. This roller is carried in bearings in the spreader 3. The spreader is pivoted to and slidable on, the fly rods 4. These fly rods are vertical, and are secured to the building, or window frame 5. The upper end of the shade has a slat 6. This slat is raised by means of a halyard 7 or similar device. The spreader is also raised by means of a suitable device, such as a halyard 8. In the embodiment of the invention chosen for illustration, the two halyards pass through a double block 9, which is secured above the center of the opening. The halyards are shown as secured to a cleat 10, located within convenient reach of the inside of the window. Between the ends of the shade when it is spread is a horizontal rod 11. The ends of this rod are connected to sleeves 12. These sleeves slide on the fly rods. The inner ends of the spreader are each supported upon a pivot sleeve 13, which slides on the fly rod. The spreader is supported in the horizontal open position by a suitable device, such as chains 14. The sleeves 12, which support the horizontal rod 11, are adjusted in position on the fly rods by means of pins 15. These pins pass through holes 16, located in the fly rods. By placing the pins in a suitable hole, the vertical position of the rod may be adjusted. The roller 2 has a spring 17, which is connected to a spear 18. This spear is supported in a bracket 19, attached to the spreader. The spear is non-circular in cross-section, and the opening in the bracket is also non-circular so that the roller may turn, while the spear cannot turn. The other end of the roller carries a pin 20, which turns in a bracket on the spreader. A valance 21, if desired, is attached to the spreader, so as to provide a finish and extend the area of the awning and also conceal the roller and protect the rolled up shade from the weather.

The operation of the device is as follows: Sufficient tension is imparted to the spring 17 by winding it up so that the entire shade may be wrapped around the roller. The awning is shown furled and stowed in Fig. 4. It is shown entirely spread, in Fig. 2. When in the position shown in Fig. 4, by slacking away on both halyards, the spreader will slide down the fly rods. The rod 11 will also slide down the fly rods until it comes in contact with the pins 15. The awning will then be in the position shown in Fig. 6. By hauling upon the halyards 7, the awning may be raised part way so that it assumes the position shown in Fig. 1. The lower part of the window will then be closed by the awning, and the upper part of the window will be left open. This permits ventilation of the room. By continuing to haul upon the halyard 7, the shade is drawn in back of the rod 11 and raised to the upper part of the window, as shown in Fig. 2. If the halyard 8 be now hauled upon, the spreader will be raised to the vertical position, the shade will be wound up upon the roller, by the action of the spring, and the parts will assume the position shown in Fig. 3. If the halyard 7 be now slacked off, the roller will wind up the upper half of the shade until the slat 6 comes to about the level of the rod 11. Both halyards may now be hauled upon. The rod 11, being caught between the two halyards, will be raised. At the same time, the halyard 8 will raise the spreader to the position shown in Fig. 4.

This awning, when furled and stowed, leaves the window opening entirely unencumbered. It also, as described, permits the closing of the lower or upper part of the window, as desired, as well as the entire window. The pins 15 and openings 16 permit the horizontal rod being adjusted in vertical position to accommodate the position of the window sashes, and to vary the inclination of the lower parts of the shade, when the awning is spread. If desired the horizontal rod may be omitted or revised to accommodate a different situation. Also the slat 6 may be removed and the shade either permitted to draw to the top of the window or it may be raised by other devices.

I have shown halyards for spreading and furling the awning. These are for illustration only, as other means may be employed. The broad features of the invention are not claimed herein, but are claimed in my copending application for patent.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. An awning which comprises a shade; and a spreader; connections for the spreader, permitting it to be raised; a spring roller, carried by the spreader, and around which the shade is wound; means for swinging and raising the spreader and a halyard for raising the shade.

2. An awning which comprises a shade; and a spreader; connections for the spreader, permitting it to be raised; a spring roller, carried by the spreader, and around which the shade is wound; an intermediate rod against which the shade bears; connections for the rod, permitting it to be raised; and means for swinging and raising the spreader and raising said rod.

3. An awning which comprises a shade; and a spreader; a spring roller, carried by the spreader, and around which the shade is wound; means for raising the other end of the shade; and means for swinging the spreader upward, and raising it upward, when so swung.

4. An awning which comprises a shade; and a spreader; a spring roller, carried by the spreader, and around which the shade is wound; means for raising the other end of the shade; an intermediate rod, against which the shade bears; and means, for swinging the spreader upward, and raising it upward, when so swung, said rod also being raised.

5. An awning which comprises a shade; and a spreader; a spring roller, carried by the spreader, and around which the shade is wound; fly rods; supports for the spreader on the fly rods; said supports sliding on the fly rods; and a halyard, for raising the spreader.

6. An awning which comprises a shade; and a spreader, a spring roller, carried by the spreader, and around which the shade is wound; fly rods; supports for the spreader, on the fly rods; said supports sliding on the fly rods; a horizontal rod, also sliding on the fly rods, and under which the shade bears; and a halyard for raising the spreader.

7. An awning which comprises a shade; and a spreader; a spring roller, carried by the spreader, and around which the shade is wound; fly rods; supports for the spreader, on the fly rods, said supports sliding on the fly rods; a slat for the free end of the shade; a halyard for raising the slat; and a halyard for raising the spreader.

8. An awning which comprises a shade; and a spreader; a spring roller, carried by the spreader, and around which the shade is wound; fly rods; supports for the spreader, on the fly rods, said supports sliding on the fly rods; a horizontal rod, also sliding on the fly rods, and under which the shade bears; a slat for the free end of the shade; a halyard for raising the slat; and a halyard for raising the spreader.

9. An awning which comprises a shade; and a spreader; a spring roller, carried by the spreader, and around which the shade is wound; fly rods; supports for the spreader, on the fly rods; said supports sliding on the fly rods; a horizontal rod, also sliding on the fly rods, and under which the shade bears; means for adjusting the vertical position of the rod; and a halyard for raising the spreader.

10. An awning which comprises a shade; and a spreader; a spring roller, carried by the spreader, and around which the shade is wound; fly rods; supports for the spreader, on the fly rods, said supports sliding on the fly rods; a horizontal rod, also sliding on the fly rods, and under which the shade bears; means for adjusting the vertical position of the rod; a slat for the free end of the shade; a halyard for raising the slat; and a halyard for raising the spreader.

This specification signed and witnessed this 20th day of June, 1912.

EDMUND F. HARTSHORN.

Witnesses:
E. L. DURGIN,
ALEX. C. ADAMS.

Copies of this patent may be obtained for five cents each, by addressing the "Commissioner of Patents, Washington, D. C."